United States Patent [19]

Kawa

[11] Patent Number: 4,502,754
[45] Date of Patent: Mar. 5, 1985

[54] OPTICAL FIBER INTERCONNECTION MECHANISM

[75] Inventor: Masao Kawa, Tokyo, Japan

[73] Assignee: Nippon Electric Co., Ltd., Tokyo, Japan

[21] Appl. No.: 457,701

[22] Filed: Jan. 13, 1983

[30] Foreign Application Priority Data

Jan. 19, 1982 [JP] Japan .............................. 57-5210[U]

[51] Int. Cl.³ .............................................. G02B 5/14
[52] U.S. Cl. .............................. 350/96.20; 350/96.21; 350/96.22
[58] Field of Search ................. 350/96.20, 96.21, 96.22

[56] References Cited

U.S. PATENT DOCUMENTS

| | | | |
|---|---|---|---|
| 4,332,435 | 6/1982 | Post | 350/96.20 |
| 4,373,776 | 2/1983 | Purdy | 350/96.20 |
| 4,418,982 | 12/1983 | Williams | 350/96.20 |

OTHER PUBLICATIONS

Bell Technical Journal, vol. 57, No. 6, Jul.–Aug., 1978, "Demountable Single-Fiber Optic Connectors and Their Measurement on Location" By: P. K. Runge & S. S. Cheng.

*Primary Examiner*—William L. Sikes
*Assistant Examiner*—Akm E. Ullah
*Attorney, Agent, or Firm*—Laff, Whitsel, Conte & Saret

[57] ABSTRACT

An optical fiber interconnection mechanism has a casing frame and a plurality of housing units vertically stacked therein. Each of the housing units has a top plate, a bottom plate, two opposed side plates and a back plate with a plurality of fiber guide ring members. A protecting cover plate is removably mounted on the front of the corresponding housing. At least one optical terminal plate is arranged horizontally between the two opposed side plates and has a plurality of optical sockets for making connections with optical fibers. A plurality of excess fiber length storage plates are located at the rear of the terminal plate. A plurality of sets of radially arranged winding saddles are positioned on the storage plates for receiving the excess lengths of the fibers connected to the optical sockets.

8 Claims, 5 Drawing Figures

OPTICAL FIBER INTERCONNECTION MECHANISM

This invention relates to an optical fiber interconnection mechanism for connecting optical transmission lines to optical communications equipment.

A typical example of such an interconnection mechanism is proposed in the article "Demountable Single-Fiber Optic Connectors and Their Measurement on Location" published in the Bell System Technical Journal, Vol. 57, No. 6, pp. 1771-1774. As shown in FIG. 2 of this article, optical fibers having excess lengths are wound around and connected to optical connectors on the back side of a jack panel. Therefore, the line connection to the optical equipment is made by means of patch cords and bay jumper cords on the front side of said panel. Thus, the fiber connection to the optical connectors on the panel is achieved in a horizontal direction normal thereto with a substantial working space required on both the front and rear sides of the panel, resulting in an unduly large depth or front-to-rear dimension for the frame of the mechanism. In addition, since the frame is designed on a predetermined scale for all the lines of either a large or a small capacity, a satisfactory packing density cannot be achieved. The result is an expensive optical fiber transmission system, particularly in the construction of stations where only small-capacity lines are needed.

Further, the fiber interconnection by means of the patch cords and bay jumper cords are made on the front side of the panel and in the same plane extending along this height of the frame. It is difficult to properly arrange means for winding up excess length of the patch cords and bay jumper cords in terms of the working spaces required on said panel. The excess and slack lengths of those cords hang down and complicate the front side of the panel, with the optical fibers also slackly connected thereto. As a result, the line connection are made with an increased danger of fiber breakage. Further, the excess lengths of the cords must necessarily be limited in terms of fiber strength. Thus, the associated optical communications equipment must be located in close proximity to the frame of the fiber interconnection mechanism.

An object of the present invention is, therefore, to provide an optical fiber interconnection mechanism which is free from the above-mentioned disadvantages of the prior art mechanism.

According to one aspect of the invention, an optical fiber interconnection mechanisms comprises a casing frame and a plurality of housing units vertically stacked therein. Each of the housing units comprises a top plate, a bottom plate, two opposed side plates, and a back plate with a plurality of fiber guide ring members. A protecting cover plate is removably mounted on the front of the corresponding housing unit. At least one optical terminal plate is arranged horizontally between the two opposed side plates behind the protecting cover plate and has a plurality of optical sockets for making vertical connection of optical fibers to the optical sockets. A plurality of excess fiber length stowage plates are located at the rear of the terminal plate, each stowage plate extending in a vertical plane. Each of the stowage plates having thereon a plurality of sets of radially arranged winding saddles for receiving excess lengths of the optical fibers which are to be connected to the optical sockets on the terminal plate.

According to another aspect of the invention, at least one of the top, bottom and side plates of each of the housing units is formed with openings, through which the fibers can be led into and out of the housing unit.

The features and advantages of the present invention will become apparent from the following description taken in conjunction with the accompanying drawings in which.

In the drawings, the same reference numerals depict the same structural elements.

Referring to FIGS. 1 to 4, a first embodiment of the invention comprises a frame 1, a plurality of housing units 3, 4, 5, and 6 which are vertically stacked in the frame 1. Optical communications equipment 29 is accommodated at the bottom of the frame 1.

Figure 1:
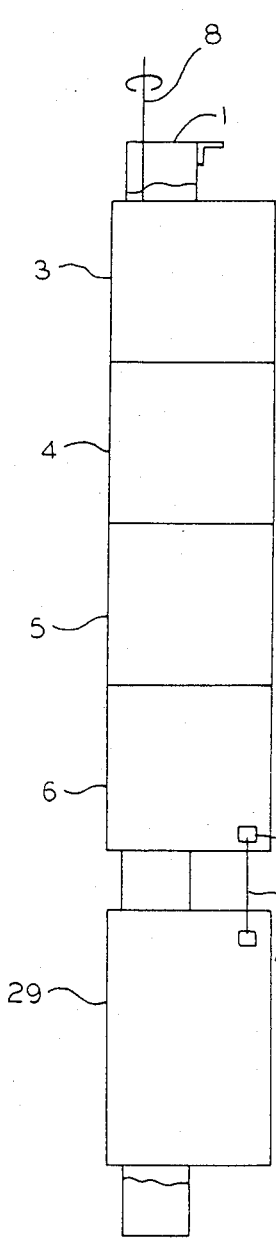
FIGS. 1 to 3 are lefthand side, front and righthand side elevational views, respectively, of a first embodiment of the invention.
Figure 2:
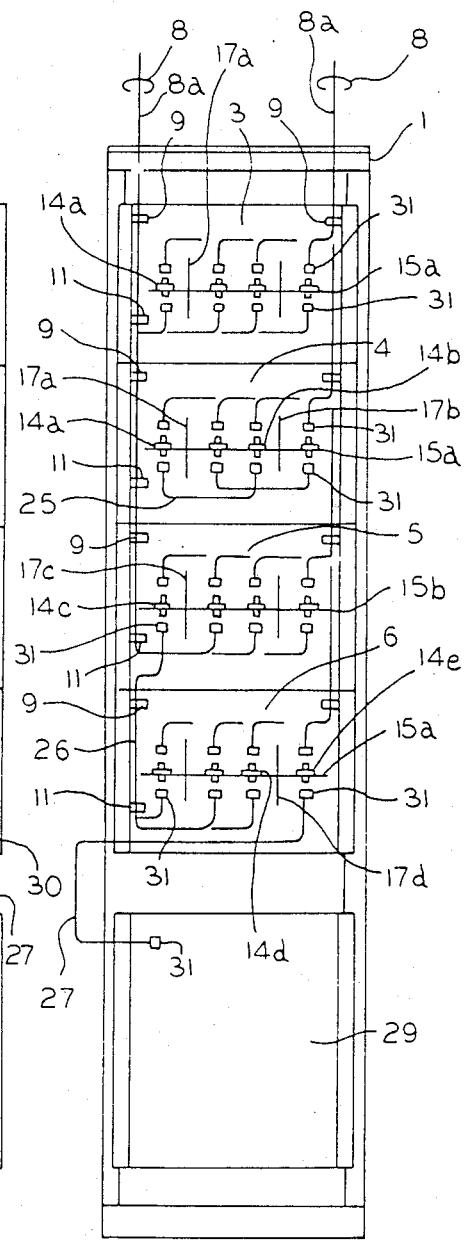
Figure 3:
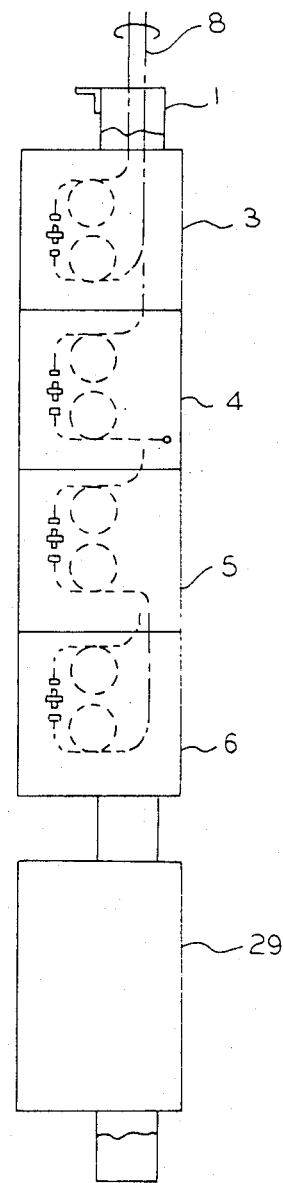

Referring to FIG. 2, the first housing unit 3 has an optical terminal plate 15a having a plurality of optical fiber sockets 14a vertically fixed thereto, fiber guide ring members 9 and 11 for laying optical fibers along the inside wall surface of the unit 3, and excess fiber-length stowage plates 17a. Similarly, the second unit 4 also contains a terminal plate 15a having a plurality of fiber sockets 14a and 14b vertically fixed thereto, ring members 9 and 11, and excess fiber-length stowage plates 17a and 17b. The third unit 5 is equipped therein with an optical terminal plate 15b having a plurality of optical sockets 14c, ring members 9 and 11, and excess fiber-length stowage plates 17c. The fourth unit 6 contains therein an optical terminal plate 15a having a plurality of optical sockets 14d and 14e vertically fitted thereto, ring members 9 and 11, and excess fiber-length stowage plates 17d.

Figure 4:
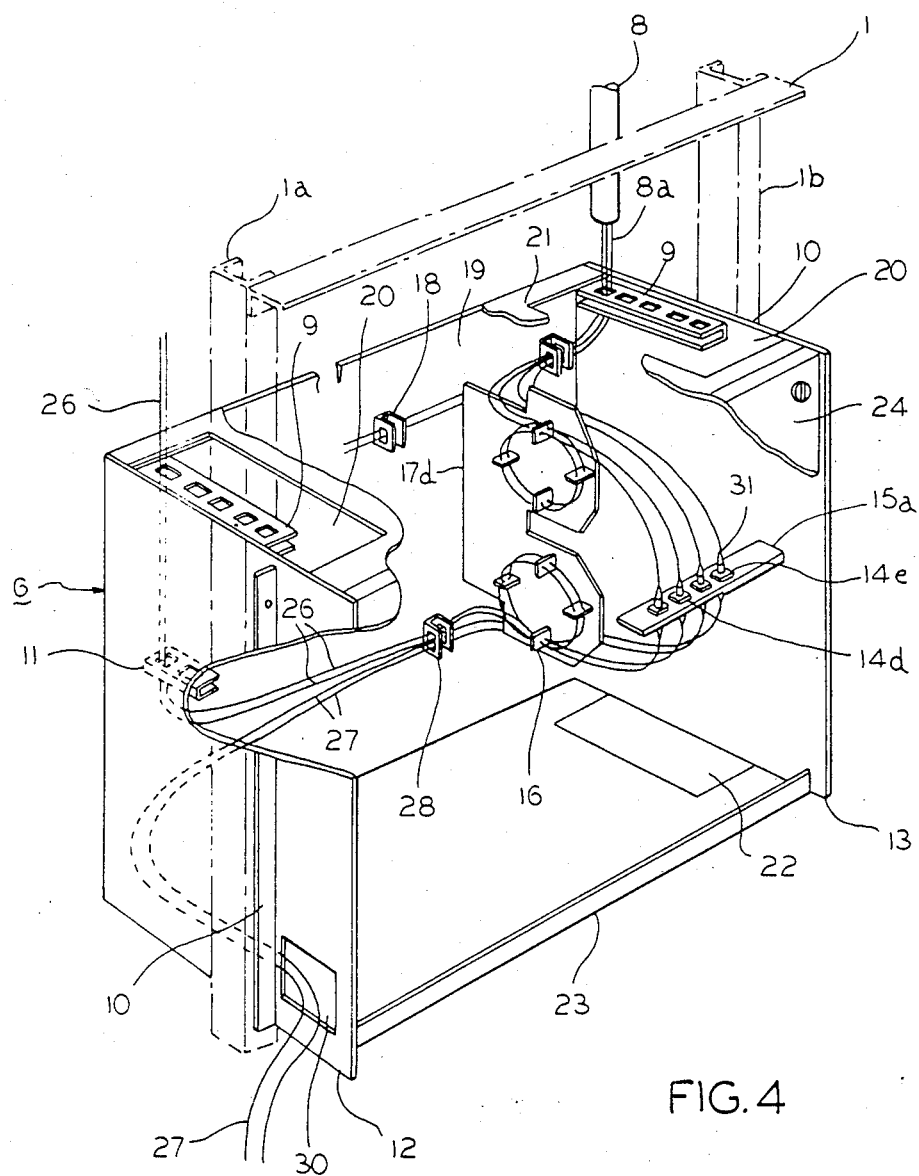
FIG. 4 is a fragmentary perspective view, on an enlarged scale, illustrating one of the terminal housing units of the embodiment.

As seen in FIGS. 2 and 4, in each of the units 3 to 6, the terminal plate 15a or 15b is arranged in a horizontal plane extending transversely across the corresponding housing unit. Each of the stowage plates 17a, 17b, 17c, or 17d is arranged in a vertical plane which is normal to the length of the adjacent terminal plate 15a or 15b.

Next, the structure of the fourth housing unit 6, as a typical representative, will be described in more detail with reference to FIG. 4. All the housing units 3 to 6 are basically the same in structure.

Referring to FIG. 4, the unit 6, mounted on the frame 1, comprises a top plate 21 having optical fiber inlet openings 20 formed along the left and right edges thereof. A bottom plate 23 has optical fiber inlet openings 22 formed along the left and right edges thereof. Two opposed side plates 12 and 13 are detachably secured to the respective adjacent members 1a and 1b of the frame 1 by means of lug members 10 which are formed on the outside of the respective side plates. The side plates 12 and 13 have a ring member 9 or members 9 and 11 secured to their inside surfaces. Fibers 8a are vertically introduced into the housing unit 6 through holes in member 9. The terminal plate 15a is arranged in a horizontal plane between the plates 12 and 13 and extends transversely across the unit 6, at the front thereof.

A plurality of fiber sockets 14d and 14e are vertically fitted to the terminal plate 15a so that individual fibers can be connected vertically into the sockets. Arranged at the rear of the terminal plate 15a are a plurality of the stowage plates 17d, each having a plurality of sets of radially arranged fiber winding saddles 16 mounted thereon. As will be readily noted, excess fiber lengths are wound around the sets of winding saddles 16 prior to their connection to the respective optical sockets 14d and 14e. In the embodiment illustrated, two sets of winding saddles 16 are mounted on either side of each of the stowage plates 17d, at levels which are above and below the terminal plate 15a so that the fiber 8a can conveniently be wound around the two sets of winding saddles in opposite directions, as shown. A back plate 19 of the housing unit 6 has ring members 18 and 28 mounted thereon, through which the fibers are threaded horizontally. A protecting cover plate 24 is removably mounted on the front of the housing unit. The terminal plate 15a lies immediately behind the cover plate.

Description will next be made with reference to FIGS. 2 and 4. The fiber distributing and connecting operations are performed in the housing units 3 to 6. The mechanism illustrated specifically interconnects optical fiber cables 8 with patch cords 25, 26 and jumper cords 27. The jumper cords extend from the equipment 29 to bottom unit 6. The patch cords 26 interconnect optical sockets 14e in unit 6 with optical sockets 14C in unit 5. The patch cords 25 interconnect various optical sockets within the units themselves.

The cables 8 are first led into the housing unit 3, each cable including a plurality of fibers 8a each terminated by an optical connector 31 secured to its forward end. The fibers 8a are directed downwardly through the ring members 9 and 11 and rearwardly along the inside surfaces of the opposed side plates 12 and 13. Further, the fibers are directed through the ring members 18 and 28 on the back plate 19 to the stowage plates 17a. The fibers 8a are then wound around the upper or lower sets of winding saddles 16 on either side of the stowage plates so that the excess lengths of the fibers 8a are stowed thereon. Thereafter, the individual fibers are connected to the respective optical sockets 14a on the terminal plate 15a by fitting the optical connectors 31 vertically into the sockets 14.

Next, in the second housing unit 4 (FIG. 2), the patch connection are made sequentially between the fibers 8a led to the terminal plate 15a, in the following order: (a) one end of each patch cord 25 is connected to a selected one of the optical sockets 14a, each of the patch cords carrying an optical connector 31 at each of its opposite ends-, (b) excess lengths of the optical fibers 8 are stowed on the stowage plate 17a and then the optical fiber is connected to a connector 14a-, (c) the patch cords 25 are directed through the ring members 28 and along the back plate 19 -, (d) excess lengths of patch cords 25 are on the stowage plate 17b, (e) the opposite ends of the patch cords 25 are connected to the optical sockets 14b.

Between the third and fourth housing units 5 and 6, connections are achieved sequentially by a use of the patch cords 26 (each carrying the optical connectors 31 at its opposite ends), the sequential connections being made in the following order: (a) connect one end of each of the patch cords 26 (FIG. 2) to the optical fiber sockets 14c in the unit 5-, (b) stow excess lengths of the patch cords 26 on the stowage plate 17c in the unit 5-, (c) direct the patch cords 26 through the ring members 9 and 11, along the adjacent side plate of the housing unit 6-direct the patch cords 26 through the ring member 28 (FIG. 4) along the back plate of housing unit 6-and stow any excess length of the patch cords 26 on the stowage plate 17d in the unit 6-, and (e) make connection at the other ends of the patch cords 26 to the optical sockets 14d.

Finally, optical fiber connections are made between the fourth housing unit 6 and the equipment 29, located in the bottom section of the same frame 1. These connections are made sequentially, in the following order, by the jumper cords 27, each carrying an optical connector 31 at its free end: (a) leading the jumper cords 27 from the equipment 29 into the housing unit 6 via a lead-in opening 30 (FIG. 4) formed in the side plate 12 of the unit 6, (b) directing the jumper cords through the ring member 28, along the back plate 19, (c) stowing excess lengths of the jumper cords 27 on the stowage plate 17d in the unit 6-, (d) connecting the cords 27 to the optical sockets 14e on the terminal plate 15a in the unit 6.

As will be apparent from the foregoing description, all the operations required in each of the housing units of the of the invention, include the laying of fibers on the side and back plates of the housing unit, the stowing of excess fiber lengths, on the stowage plates which conventional fiber interconnection mechanisms do not have and a completion of their connection to the optical sockets. These operations can be carried out in order, quite independently of each other, irrespective of the interconnecting conditions required of the optical fibers. It will be readily appreciated, therefore, that with the fiber interconnection mechanism, the fiber distributing and connecting operations can be carried out as required for altering the line connection, efficiently, and with ease. The conventional mechanism shown in the above-mentioned article must be installed with a working space provided on the rear side thereof, since the fiber connection operations to the optical connectors on the panel are performed not only on the front side of the panel but also on the rear side thereof so that the fiber may be horizontally held. On the other hand, in the mechanism of the invention, all the required operations required can be conveniently performed in front of the frame, since the terminal plate in each unit is arranged in a manner which enables optical fiber connections to be made to the optical sockets, in a vertical direction. As a result, the floor space including a working space required for frame installation in the station as well as the front-to-rear dimension of the frame can be reduced to a substantial extent. Moreover, the arrangement of the terminal plates in separate housing units enables highly efficient, high-density packaging of the fibers in the system, irrespective of the conditions in any particular station building.

Figure 5:
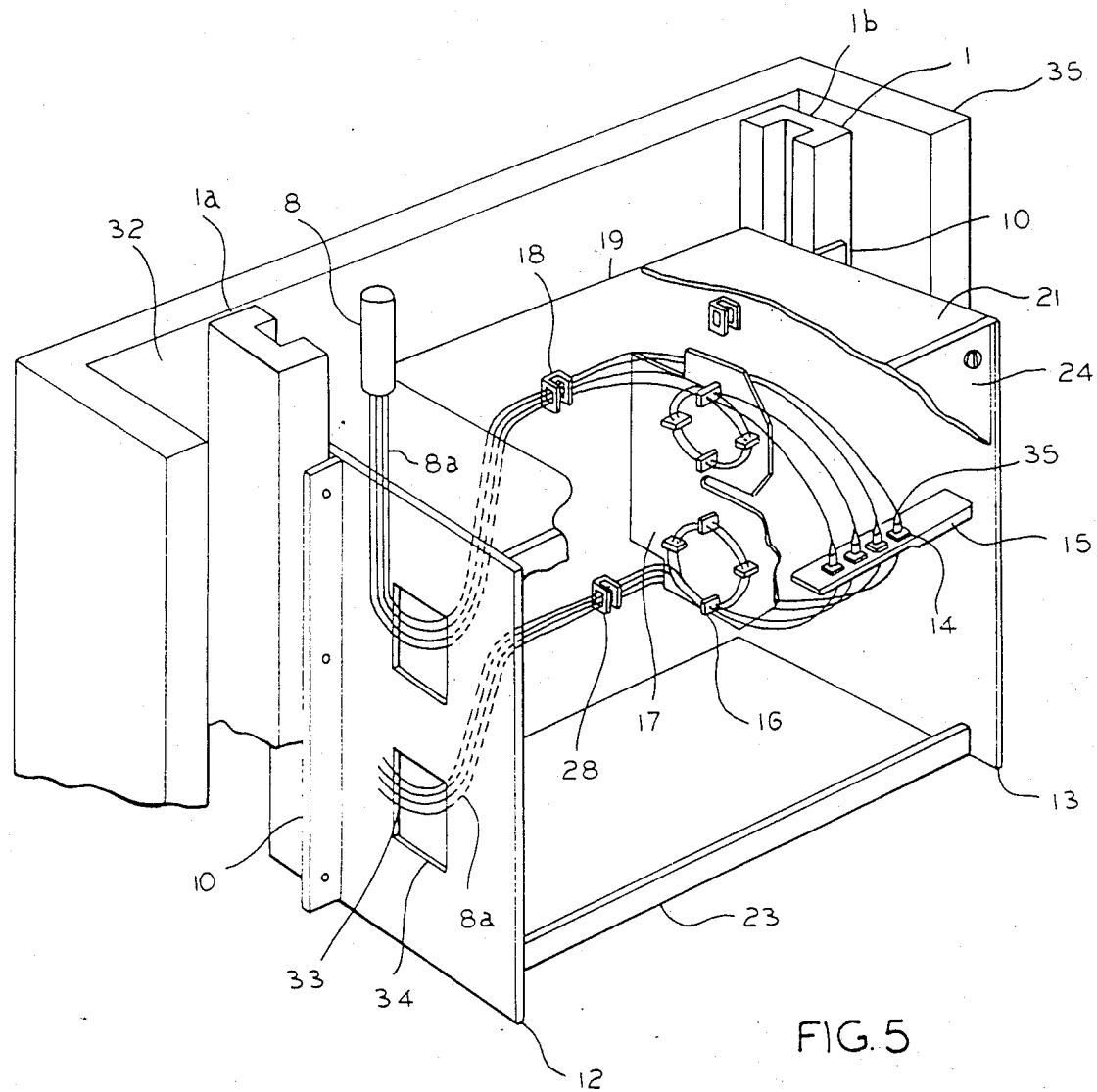
FIG. 5 shows a fragmentary perspective view, on an enlarged scale, of a second embodiment.

Referring to FIG. 5, a second embodiment of the invention uses basically the same structure as the first embodiment described above, except that the second embodiment includes a cable duct 32 extending vertically on one side of the frame 1 and between a frame rack 35 and those side plates 12 of the housing units 3 to 6 which are formed with cable inlet and outlet openings 33 and 34. With this embodiment, it will be apparent that optical fibers can be led through the cable duct 32 and openings 33 and 34, into an out of the units 3 to 6.

It will be appreciated from the foregoing description that the the invention has definite advantages over the prior art in that lines having a wide range of capacity can be packaged therein, efficiently and with substantial economy. The floor space required by the inventive cabinet is substantially reduced. The fiber laying and connecting operations can be executed with greatly improved efficiency.

What is claimed is:

1. An optical fiber interconnection frame for cross-connecting optical transmission lines and optical communications equipment, said frame comprising:
   a casing frame; and
   a plurality of housing units stacked vertically in said frame, each of the housing units including:
   a top plate;
   a bottom plate;
   two opposed side plates;
   a back plate having a plurality of fiber guide members;
   a protecting cover plate removably mounted on the front of a corresponding housing unit;
   at least one optical terminal plate arranged horizontally between said two opposed side plates and behind the protecting cover plate, terminal plate having a plurality of optical sockets for completing vertical connections of individual optical fibers to the individual optical sockets; and
   a plurality of excess fiber-length stowage plates located at the rear of said terminal plate, each of said stowage plates extending in a vertical plane normal to said stowage plates, each of the stowage plates having a plurality of sets of radially arranged winding members for receiving excess lengths of said fibers connected to the optical sockets on said terminal plate.

2. An optical fiber interconnection frame as claimed in claim 1, in which at least one of the top, bottom and side plates of each of said housing units has openings through which said fibers are extended into and out of the corresponding housing unit.

3. A vertical distribution frame for interconnecting optical fibers in any desired pattern, said frame comprising a plurality of units stacked one above the other; each of said units having a field of optical fiber connectors arranged near the front of said unit; means for bringing in, guiding, and supporting incoming optical fibers terminated in means for completing connections to any connector in said field of connectors; optical fiber patch cords having connectors on opposite ends thereof for selectively completing interconnections between connectors in said fields of connectors, whereby any of said incoming optical fibers may be cross-connected with any other of said incoming optical fibers by means of said patch cords; and at least one stowage plate means behind said connector field, each of said stowage plate means having a plurality of winding members thereon for taking up excess lengths of said fibers.

4. The frame of claim 3 wherein each of said units comprises a separate and completely enclosed box like member, and means comprising at least one jumper cord of optical fibers having connectors on their opposite ends for completing cross-connectors between said fields of connectors in separate ones of said units.

5. The frame of claim 4 wherein each connector in said connector fields comprises an associated pair of sockets providing means for connecting said incoming optical fibers into one socket and a patch cord or jumper cord connector into the associated one of said sprockets.

6. The frame of claim 5 wherein each of said associated pair of sockets is aligned vertically, one of said incoming optical fibers plugging into the upper one of said sockets and said patch cords and jumper cords plugging into the lower one of said sockets.

7. The frame of claim 5 wherein said winding members are oriented radically on said stowage plate means so that said excess fibers wrap circumferentially around said saddles.

8. The frame of claim 5 including channel means extending vertically through said frame for carrying said jumper cords from unit to unit.

* * * * *